(12) United States Patent
Kim et al.

(10) Patent No.: US 10,868,294 B2
(45) Date of Patent: Dec. 15, 2020

(54) POSITIVE ELECTRODE FOR LITHIUM SECONDARY BATTERY AND LITHIUM SECONDARY BATTERY INCLUDING SAME

(71) Applicant: LG Chem, Ltd., Seoul (KR)

(72) Inventors: Kyung-Min Kim, Daejeon (KR); Jung-Seok Choi, Daejeon (KR); Song-Taek Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/481,667

(22) PCT Filed: Jul. 26, 2018

(86) PCT No.: PCT/KR2018/008484
§ 371 (c)(1),
(2) Date: Jul. 29, 2019

(87) PCT Pub. No.: WO2019/022541
PCT Pub. Date: Jan. 31, 2019

(65) Prior Publication Data
US 2019/0348666 A1    Nov. 14, 2019

(30) Foreign Application Priority Data

Jul. 26, 2017 (KR) .................. 10-2017-0094550
Jul. 25, 2018 (KR) .................. 10-2018-0086694

(51) Int. Cl.
*H01M 4/131* (2010.01)
*H01M 4/04* (2006.01)
(Continued)

(52) U.S. Cl.
CPC ............ *H01M 4/131* (2013.01); *C01G 51/06* (2013.01); *H01M 4/0404* (2013.01);
(Continued)

(58) Field of Classification Search
CPC .... H01M 4/131; H01M 4/133; H01M 4/1391; H01M 4/364; H01M 4/366; H01M 4/622; H01M 4/0404; C01G 51/06
See application file for complete search history.

(56) References Cited

U.S. PATENT DOCUMENTS

2011/0039160 A1    2/2011 Takahata et al.
2011/0250507 A1*  10/2011 Yoshimura ........ H01M 10/0525
429/338

(Continued)

FOREIGN PATENT DOCUMENTS

CN    105810885 A    7/2016
JP     4236308 B2    3/2009
(Continued)

OTHER PUBLICATIONS

Machine translation of CN 105810885 (no date).*

(Continued)

*Primary Examiner* — Amanda C. Walke
(74) *Attorney, Agent, or Firm* — Morgan, Lewis & Bockius LLP (57) ABSTRACT

A positive electrode for a lithium secondary battery includes a positive electrode current collector, a positive electrode active material layer, and a primer layer formed between the positive electrode current collector and the positive electrode active material layer. The primer layer includes lithium carbonate ($Li_2CO_3$) particles having two or more different particle diameters, a binder polymer, and a conductive material. The lithium secondary battery attains the overcharge cutoff voltage rapidly by virtue of the gas generated between the positive electrode current collector and the positive electrode active material layer, in an overcharged state. Thus, it is possible to ensure the safety of the lithium secondary battery.

9 Claims, 5 Drawing Sheets

(51) Int. Cl.
| | |
|---|---|
| H01M 4/1391 | (2010.01) |
| H01M 4/36 | (2006.01) |
| H01M 4/62 | (2006.01) |
| H01M 10/0525 | (2010.01) |
| H01M 10/42 | (2006.01) |
| H01M 4/133 | (2010.01) |
| C01G 51/06 | (2006.01) |
| H01M 4/02 | (2006.01) |

(52) U.S. Cl.
CPC ......... *H01M 4/133* (2013.01); *H01M 4/1391* (2013.01); *H01M 4/364* (2013.01); *H01M 4/366* (2013.01); *H01M 4/622* (2013.01); *H01M 10/0525* (2013.01); *H01M 10/42* (2013.01); *H01M 2004/028* (2013.01)

(56) References Cited

U.S. PATENT DOCUMENTS

| | | | | |
|---|---|---|---|---|
| 2012/0094177 | A1* | 4/2012 | Honoki | H01M 4/0404 429/211 |
| 2012/0231343 | A1* | 9/2012 | Nagase | C01G 53/44 429/231.1 |
| 2015/0099193 | A1* | 4/2015 | Hamasaki | H01M 10/052 429/338 |
| 2015/0263341 | A1* | 9/2015 | Kato | C01G 45/1214 429/223 |
| 2016/0248121 | A1* | 8/2016 | Uematsu | H01M 2/0207 |
| 2017/0194628 | A1* | 7/2017 | Kibune | H01M 4/625 |
| 2018/0159109 | A1* | 6/2018 | Tsubouchi | H01M 2/1241 |
| 2019/0013508 | A1* | 1/2019 | Takanashi | H01M 4/5825 |

FOREIGN PATENT DOCUMENTS

| | | | |
|---|---|---|---|
| JP | 2015-153720 | A | 8/2015 |
| JP | 2016-076439 | A | 5/2016 |
| KR | 10-2007-0090500 | A | 9/2007 |
| KR | 10-2007-0105724 | A | 10/2007 |
| KR | 10-2012-0024742 | A | 3/2012 |
| KR | 10-2014-0083199 | A | 7/2014 |

OTHER PUBLICATIONS

Machine translation of the written opinion (no date).*
Extended European Search Report issued from the European Patent Office dated Mar. 31, 2020 in corresponding European patent application No. 18839320.1.
Y. Bi et al., "Stability of $Li_2CO_3$ in cathode of lithium ion battery and its influence on electrochemical performance", RSC Advances, 2016, vol. 6, No. 23, pp. 19233-19237.

* cited by examiner

POSITIVE ELECTRODE FOR LITHIUM SECONDARY BATTERY AND LITHIUM SECONDARY BATTERY INCLUDING SAME

CROSS-REFERENCES TO RELATED APPLICATIONS

This application is a U.S. national phase application, pursuant to 35 U.S.C. § 371, of PCT/KR2018/008484, filed Jul. 26, 2018, designating the United States, which claims priority to Korean Application No. 10-2017-0094550, filed Jul. 26, 2017, and Korean Application No. 10-2018-0086694, filed Jul. 25, 2018. The entire contents of the aforementioned patent applications are incorporated herein by this reference.

TECHNICAL FIELD

The present disclosure relates to a positive electrode for a lithium secondary battery and a lithium secondary battery including the same.

BACKGROUND ART

As electronic, communication, and computer industries have been developed rapidly, reducing size and weight and increasing functionalization of instruments have been required. In addition, as the portable electronic appliances, such as camcorders, cellular phones, and notebook PCs, have been used generally, batteries having a low weight, a long service life, and high reliability have been demanded increasingly. Particularly, since the rechargeable lithium secondary batteries have an energy density per unit weight three times higher than an energy density per unit weight of the conventional lead storage battery, nickel-cadmium battery, nickel-metal hydride battery, nickel-zinc battery, or the like, and allow rapid charging, research and development thereof have been conducted actively domestically and internationally.

Recently, some technologies, such as high-capacity active materials, thin separators and high-voltage driving, have been further developed in order to provide lithium secondary batteries with high energy density and low cost. Under these circumstances, overcharging becomes a serious problem, and thus it is required to solve the ignition and explosion issues in an overcharged state.

To solve this problem, there has been an attempt to incorporate lithium carbonate ($Li_2CO_3$), known to generate gas at about 5.0V, in order to increase positive electrode resistance significantly to attain the overcharge cut-off voltage.

However, in such attempt, gas generation from lithium carbonate may be insufficient or positive electrode resistance may be increased less than expectations, and thus it takes a long time to attain the overcharge cutoff voltage. Therefore, in this case, there is a problem in that battery safety cannot be ensured sufficiently.

DISCLOSURE

Technical Problem

The present disclosure is designed to solve the problems of the related art, and therefore the present disclosure is directed to providing a positive electrode for a lithium secondary battery which ensures the safety of a lithium secondary battery in an overcharged state.

The present disclosure is also directed to providing a lithium secondary battery including the positive electrode.

Technical Solution

According to the first embodiment of the present disclosure, there is provided a positive electrode (cathode) for a lithium secondary battery which includes a positive electrode current collector, a positive electrode active material layer, and a primer layer formed between the positive electrode current collector and the positive electrode active material layer. The primer layer includes lithium carbonate ($Li_2CO_3$) particles having two or more different particle diameters, a binder polymer, and a conductive material.

According to the second embodiment of the present disclosure, there is provided the positive electrode for a lithium secondary battery as defined in the first embodiment, wherein the lithium carbonate particles may be present in an amount of 90 to 99.9 wt % based on the solid content in the primer layer.

According to the third embodiment of the present disclosure, there is provided the positive electrode for a lithium secondary battery as defined in the first or the second embodiment, wherein the lithium carbonate particles may include large lithium carbonate particles and small lithium carbonate particles.

According to the fourth embodiment of the present disclosure, there is provided the positive electrode for a lithium secondary battery as defined in the third embodiment, wherein the large lithium carbonate particles have a particle diameter of 3 to 15 μm, and the small lithium carbonate particles have a particle diameter equal to or greater than 0.1 μm and less than 3 km.

According to the fifth embodiment of the present disclosure, there is provided the positive electrode for a lithium secondary battery as defined in the third or the fourth embodiment, wherein the small lithium carbonate particles may be present in an amount of 80 to 120 parts by weight based on 100 parts by weight of the large lithium carbonate particles.

According to the sixth embodiment of the present disclosure, there is provided the positive electrode for a lithium secondary battery as defined in any one of the first to the fifth embodiments, wherein the primer layer has a thickness of 3 to 15 μm.

According to the seventh embodiment of the present disclosure, there is provided the positive electrode for a lithium secondary battery as defined in any one of the third to the fifth embodiments, wherein the small lithium carbonate particles may be larger than the diameter of the interstitial volume which is a space formed by interconnection of the large lithium carbonate particles but may have a smaller particle diameter size compared to the large lithium carbonate particles.

According to the eighth embodiment of the present disclosure, there is provided the positive electrode for a lithium secondary battery as defined in any one of the first to the seventh embodiments, wherein the space formed among the lithium carbonate particles may function as pores in the primer layer.

According to the ninth embodiment of the present disclosure, there is provided the positive electrode for a lithium secondary battery as defined in any one of the first to the eighth embodiments, wherein the primer layer may be porous.

According to the tenth embodiment of the present disclosure, there is provided a lithium secondary battery including the positive electrode for a lithium secondary battery as defined in any one of the first to the ninth embodiments.

Advantageous Effects

According to an embodiment of the present disclosure, there is provided a lithium secondary battery which attains the overcharge cutoff voltage rapidly by virtue of the gas generated between the positive electrode current collector and the positive electrode active material layer, in an overcharged state. Thus, it is possible to ensure the safety of the lithium secondary battery.

According to another embodiment of the present disclosure, there is provided a lithium secondary battery having improved safety by virtue of a decrease in time required to attain the overcharge cutoff voltage.

According to still another embodiment of the present disclosure, there is provided a lithium secondary battery which ensures maximized capacity through the minimization of the volume occupied by the primer layer for gas generation.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a positive electrode for a lithium secondary battery which includes a positive electrode current collector, a positive electrode active material layer, and a primer layer formed between the positive electrode current collector and the positive electrode active material layer. The primer layer includes lithium carbonate ($Li_2CO_3$) particles having two or more different particle diameters, a binder polymer, and a conductive material, and the primer layer substantially includes no positive electrode active material.

Hereinafter, the present disclosure will be explained with reference to FIG. 1 and FIG. 2.

Figure 1:
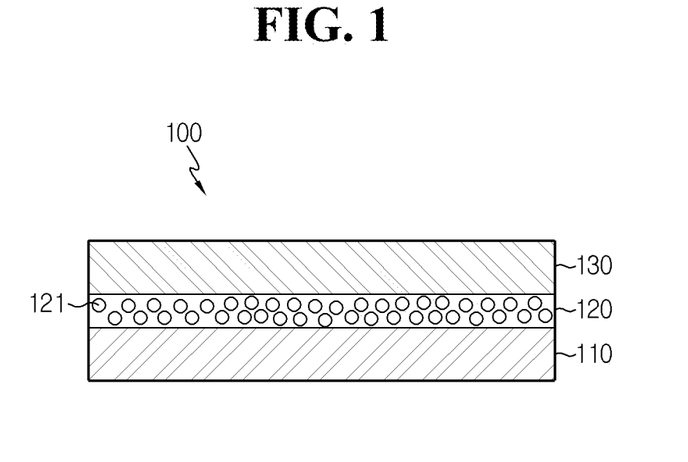
FIG. 1 is a schematic sectional view illustrating the positive electrode to be improved by the present disclosure.

FIG. 1 is a schematic sectional view illustrating an embodiment of the conventional positive electrode 100 which includes a lithium carbonate-containing primer layer 120 formed between a positive electrode current collector 110 and a positive electrode active material layer 130.

In FIG. 1, the primer layer 120 includes lithium carbonate particles 121, and the lithium carbonate particles have substantially uniform particle diameter.

Figure 2:
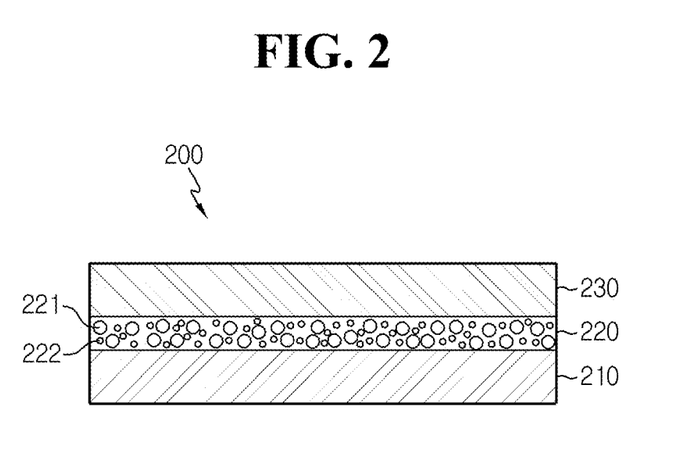
FIG. 2 is a schematic sectional view illustrating the positive electrode according to an embodiment of the present disclosure.

Meanwhile, FIG. 2 is a schematic sectional view illustrating the positive electrode 200 which includes a lithium carbonate-containing primer layer 220 formed between a positive electrode current collector 210 and a positive electrode active material layer 230 according to an embodiment of the present disclosure. As shown in FIG. 2, the primer layer 220 includes large lithium carbonate particles 221 having a relatively larger particle diameter and small lithium carbonate particles 222 having a relatively smaller particle diameter. In FIG. 2, the large lithium carbonate particles 221 and the small lithium carbonate particles 222 are spaced apart from each other. However, according to a preferred embodiment, the large lithium carbonate particles 221 and the small lithium carbonate particles 222 are interconnected to form an interstitial volume which is a space formed by interconnection of particles, and the interstitial volume may function as pores.

The lithium carbonate particles may be present in an amount of 90 to 99.9 wt % based on the solid content in the primer layer. When the content of the lithium carbonate particles is less than the lower limit, electric resistance is increased insufficiently. When the content of the lithium carbonate particles is larger than the upper limit, bindability among the ingredients or electroconductivity may be insufficient.

The lithium carbonate particles may have a shape, such as a spherical, elliptical or polygonal shape, but is not limited thereto. In addition, the terms 'spherical' and 'elliptical' have broad meanings including not only perfect 'spherical' and 'elliptical' shapes but also spherical and elliptical shapes having a dented portion or commonly acceptable levels of spherical and elliptical shapes.

The lithium carbonate particles have two or more different particle diameters. For example, the lithium carbonate particles may have two or more different particle diameter ranges, and in other words, they may include large particles and small particles. As used herein, the term 'particle diameter' refers to a particle diameter D50 which means the particle diameter corresponding to 50% on the weight basis in a particle size distribution curve.

The large lithium carbonate particles may have a particle diameter of 3 to 15 μm. According to an embodiment of the present disclosure, the particle diameter D50 of the large particles may be 3 μm or greater, 4 μm or greater, or 5 μm or greater, within the above-defined range. When the particle diameter of the large lithium carbonate particles is greater than the upper limit, the volume of an electrode is increased undesirably. When the particle diameter of the large lithium carbonate particles is smaller than the lower limit, it is difficult to accomplish the desired effect of the present disclosure, i.e., the effect of interrupting the conductive path of the primer layer, after gas generation that occurs at a specific voltage, by reducing the content of a conductive material. For example, the large lithium carbonate particles may have a BET specific surface area of 0.4 to 2.0 $m^2/g$.

Meanwhile, the primer layer may have a thickness of 3 to 15 μm.

As used herein, the term 'BET specific surface area' refers to the specific surface area determined by the BET method using nitrogen as adsorption gas.

The small lithium carbonate particles may have a particle diameter equal to or greater than 0.1 μm and less than 3.0 μm. According to an embodiment of the present disclosure, the small particles may have a particle diameter of 2.5 μm or less, 2.0 μm or less, or 1.5 μm or less, within the above-defined range. When the small lithium carbonate particles have a particle diameter greater than the upper limit, it takes a long time to attain the overcharge cutoff voltage. When the small lithium carbonate particles have a particle diameter smaller than the lower limit, the content of a conductive material is increased, thereby making it difficult to accomplish the effect of the present disclosure. It is also difficult to form pores through which lithium ions may be transported smoothly. For example, the small lithium carbonate particles may have a BET specific surface area greater than 2.0 $m^2/g$ and equal to or less than 5.0 $m^2/g$.

The lithium carbonate particles may include the small lithium carbonate particles in an amount of 0.1 to 200 parts by weight, preferably 50 to 150 parts by weight, and more preferably 80 to 120 parts by weight, based on 100 parts by weight of the large lithium carbonate particles. When the content of the small lithium carbonate particles is greater than the upper limit, the surface area of the particles contained in the primer layer is increased, resulting in a relative decrease in content of the conductive material, thereby providing increased electric resistance. In addition, the small particles show a higher reaction rate compared to the large particles. Thus, as the content of the small particles is increased, the amount of vaporized lithium carbonate is increased, and thus the overcharge cutoff voltage may be attained earlier. On the other hand, when the content of the small particles is less than the lower limit, the time of attainment of overcharge cutoff voltage may be delayed.

The primer layer may have a porous structure sustained by the lithium carbonate particles. In other words, the lithium carbonate particles are interconnected and the space formed among the interconnected lithium carbonate particles may function as pores. In addition, the small lithium carbonate particles may have a particle diameter with which the particles may enter the space formed by interconnection of the large lithium carbonate particles, i.e., the interstitial volume. Alternatively, the small lithium carbonate particles may have a particle diameter greater than the space formed by interconnection of the large lithium carbonate particles, i.e., the interstitial volume, but smaller than the particle diameter of the large lithium carbonate particles.

The conductive material may be present in an amount of 0.1 to 10 wt % based on the solid content in the primer layer. According to the present disclosure, the required content of the conductive material is reduced compared to the content thereof in the case of the use of small lithium carbonate particles alone. Thus, the possibility of interruption of the conductive path of the primer layer after the gas generation occurring at a specific voltage is increased.

The conductive material may be at least one selected from the group consisting of a graphite-based conductive material, carbon black-based conductive material, and metal-based or metal compound-based conductive material. Herein, the graphite-based conductive material may be at least one of artificial graphite and natural graphite, the carbon black-based conductive material may be at least one of ketjen black, denka black, thermal black and channel black, and the metal-based or metal compound-based conductive material may be at least one of tin, tin oxide, tin phosphate ($SnPO_4$), titanium oxide, potassium titanate, and perovskite-type materials such as $LaSrCoO_3$ and $LaSrMnO_3$.

The lithium carbonate particle, conductive material, and the binder polymer may be applied onto the positive electrode current collector, after they are dispersed or dissolved in an organic solvent to form a slurry state. Herein, the solid content in the organic solvent, i.e. the content of the lithium carbonate particles, conductive material and binder is not particularly limited, as long as it provides slurry having a viscosity to allow the slurry to be applied with ease without dripping. In addition, the organic solvent preferably includes any one selected from the group consisting of N-methyl-2-pyrrolidone (NMP), methoxypropyl acetate, butyl acetate, glycol acid, butyl ester, butyl glycol, methylalkyl polysiloxane, alkyl benzene, propylene glycol, xylene, monophenyl glycol, aralkyl-modified methylalkyl polysiloxane, polyether-modified dimethylpolysiloxane copolymer, polyacrylate solution, alkylbenzene, diisobutyl ketone, organically modified polysiloxane, butanol, isobutanol, modified polyacrylate, modified polyurethane and polysiloxane-modified polymer, or a combination of two or more of them.

In general, the positive electrode current collector is formed to have a thickness of 3 to 500 μm. The positive electrode current collector is not particularly limited, as long as it causes no chemical change in the corresponding battery and has high conductivity. Particular examples of the positive electrode current collector may include stainless steel; aluminum; nickel; titanium; baked carbon; copper; stainless steel surface-treated with carbon, nickel, titanium or silver; or the like. It is possible to increase the adhesion of a positive electrode active material by forming fine surface irregularities on the surface of a current collector. The positive electrode current collector may have various shapes, such as a film, sheet, foil, net, porous body, foam and a non-woven fabric body.

Particular examples of the positive electrode active material contained in the positive electrode active material layer may include, but are not limited to layered compounds such as lithium cobalt oxide ($LiCoO_2$) and lithium nickel oxide ($LiNiO_2$), or compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O$, $LiFe_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); spinel type lithium manganese composite oxides represented by the chemical formula of $LiNi_xMn_{2-x}O_4$ (x=0.01-0.6); $LiMn_2O_4$ in which Li is partially substituted with an alkaline earth metal ion; disulfide compounds; $Fe_2(MoO_4)_3$; or the like.

Meanwhile, the positive electrode active material layer may further include a conductive material, binder polymer, and a filler, besides the positive electrode active material.

Herein, the conductive material is added generally in an amount of 1 to 50 wt % based on the total weight of the mixture including the positive electrode active material. The conductive material is not particularly limited, as long as it causes no chemical change in the corresponding battery and has conductivity. Particular examples of the conductive material include graphite, such as natural graphite or artificial graphite; carbon black, such as carbon black, acetylene black, ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives.

In addition, the binder polymer is an ingredient which assists binding between the positive electrode active material and the conductive material and binding to the current collector. In general, the binder polymer is added in an amount of 1 to 50 wt % based on the total weight of the mixture including the positive electrode active material. Particular examples of the binder polymer include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propyl ene-diene terpolymer (EPDM), sulfonated EPDM, styrene butyrene rubber, fluororubber, various copolymers, or the like.

Further, the filler is an ingredient that inhibits swelling of the positive electrode and is used optionally. The filler is not particularly limited, as long as it causes no chemical change in the corresponding battery and is a fibrous material. Particular examples of the filler include olefinic polymers, such as polyethylene or polypropylene; and fibrous materials, such as glass fibers or carbon fibers.

In another aspect of the present disclosure, there is provided a lithium secondary battery including the above-described positive electrode, a negative electrode (anode), a separator and a lithium salt-containing non-aqueous electrolyte.

The negative electrode is obtained by applying negative electrode active material slurry containing a negative electrode active material to a negative electrode current collector, followed by drying and pressing. The negative electrode active material slurry may further include the above-mentioned conductive material, binder polymer, filler, or the like, if desired.

In general, the negative electrode current collector is formed to have a thickness of 3 to 500 μm. The negative electrode current collector is not particularly limited, as long as it causes no chemical change in the corresponding battery and has conductivity. Particular examples of the negative electrode current collector may include copper; stainless steel; aluminum; nickel; titanium; baked carbon; copper or stainless steel surface-treated with carbon, nickel, titanium or silver; or the like. As mentioned earlier with reference to the positive electrode current collector, it is possible to increase the adhesion of a negative electrode active material by forming fine surface irregularities on the surface of a current collector. The negative electrode current collector may have various shapes, such as a film, sheet, foil, net, porous body, foam and a non-woven fabric body.

Particular examples of the negative electrode active material include carbon such as non-graphitizable carbon or graphite-based carbon; metal composite oxides, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, elements of Group 1, 2 or 3 in the Periodic Table, halogen; 0<x≤1; 1≤y≤3; 1≤z≤8); lithium metal; lithium alloy; silicon-based alloy; tin-based alloy; metal oxides, such as $AuO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ and $Bi_2O_5$; conductive polymers, such as polyacetylene; Li—Co—Ni type materials; titanium oxide; lithium titanium oxide; or the like.

According to an embodiment, when using lithium titanium oxide (LTO) as the negative electrode active material, the above-mentioned electrode structure is preferred since LTO itself has low electroconductivity. In addition, in this case, it is preferred to use a spinel type lithium manganese composite oxide represented by the formula of $LiNi_xMn_{2-x}O_4$ (x=0.01-0.6) and having relatively high potential by virtue of the high potential of LTO, as the positive electrode active material.

In addition, the lithium secondary battery includes an electrode assembly having the separator interposed between the positive electrode and the negative electrode, and a lithium salt-containing electrolyte injected thereto.

The separator is interposed between the positive electrode and the negative electrode. An insulating thin film having high ion permeability and mechanical strength is used as the separator. The separator generally has a pore diameter of 0.01 to 10 μm and a thickness of 5 to 300 μm. Particular examples of the separator include sheets or nonwoven fabric made of olefinic polymers, such as polypropylene having chemical resistance and hydrophobic property; glass fibers or polyethylene, or the like. When a solid electrolyte, such as a polymer, is used as electrolyte, the solid electrolyte may also function as a separator.

The lithium salt-containing electrolyte includes an electrolyte and a lithium salt, and the electrolyte includes a non-aqueous organic solvent, organic solid electrolyte, inorganic solid electrolyte, or the like, but is not limited thereto.

Particular examples of the non-aqueous organic solvent include aprotic solvents, such as N-methyl-2-pyrrolidone, propylene carbonate, ethylene carbonate, butylene carbonate, dimethyl carbonate, diethyl carbonate, γ-butyrolactone, 1,2-dimethoxyethane, tetrahydroxy franc, 2-methyl tetrahydrofuran, dimethyl sulfoxide, 1,3-dioxolan, formamide, dimethyl formamide, dioxolan, acetonitrile, nitromethane, methyl formate, methyl acetate, triphosphate, trimethoxymethane, dioxolan derivatives, methyl sulforane, 1,3-dimethyl-2-imidazolidione, propylene carbonate derivatives, tetrahydrofuran derivatives, ethers, methyl propionate, ethyl propionate, or the like.

Particular examples of the organic solid electrolyte may include polyethylene derivatives, polyethylene oxide derivatives, polypropylene oxide derivatives, phosphate polymer, polyagitation lysine, polyester sulfide, polyvinyl alcohol, polyvinylidene fluoride, polymers containing an ionically dissociatable group, or the like.

Particular examples of the inorganic solid electrolyte may include nitrides, halides and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material which can be dissolved in the non-aqueous electrolyte with ease, and particular examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lithium lower aliphatic carboxylate, lithium tetraphenyl borate, imide, or the like.

In addition, the electrolyte may further include pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethanol and aluminum trichloride in order to improve the charge/discharge characteristics, flame resistance, or the like. Optionally, the electrolyte may further include a halogen-containing solvent, such as carbon tetrachloride or trifluoroethylene, in order to impart non-combustibility. The electrolyte may further include carbon dioxide gas in order to improve the high-temperature storage characteristics. In addition, the electrolyte may further include fluoro-ethylene carbonate (FEC), propene sultone (PRS), or the like.

According to a preferred embodiment, it is possible to prepare a lithium salt-containing non-aqueous electrolyte by adding a lithium salt, such as $LiPF_6$, $LiClO_4$, $LiBF_4$ or $LiN(SO_2CF_3)_2$ to a mixed solvent containing a cyclic carbonate, such as EC or PC, as a solvent having high dielectric property in combination with a linear carbonate, such as DEC, DMC or EMC, as a solvent having low viscosity.

In still another aspect, there are provided a battery module including the lithium secondary battery as a unit cell, and a battery pack including the battery module.

The battery pack may be used as a power source for medium- or large-scale devices that require high-temperature stability, long cycle characteristics and high rate characteristics.

Preferred examples of the medium- or large-scale devices include, but are not limited to power tools driven by the power of an electric motor; electric cars including electric vehicles (EV), hybrid electric vehicles (HEV), plug-in hybrid electric vehicles (PHEV), or the like; electric two-wheeled vehicles including E-bikes and E-scooters; electric golf carts; electric power storage systems; or the like.

Mode for Disclosure

Hereinafter, the present disclosure will be explained in detail with reference to Examples. However, the scope of the present disclosure is not limited to the exemplary embodiments set forth therein.

Example 1

First, 2 g of polyvinylidene fluoride as a binder polymer was dissolved in N-methyl pyrrolidone. Subsequently, lithium carbonate ($Li_2CO_3$) particles including 50 g of small lithium carbonate particles having a particle diameter of 2.0 µm and 50 g of large lithium carbonate particles having a particle diameter of 5.0 jam, and 4 g of Super-P as a conductive material were added thereto to prepare slurry for forming a primer layer. After the slurry was coated onto an aluminum positive electrode current collector, it was dried in a vacuum oven at 120° C. to form a primer layer with a loading amount of 0.03 g/cm². The resultant primer layer had a thickness of 9 µm.

Figure 3:
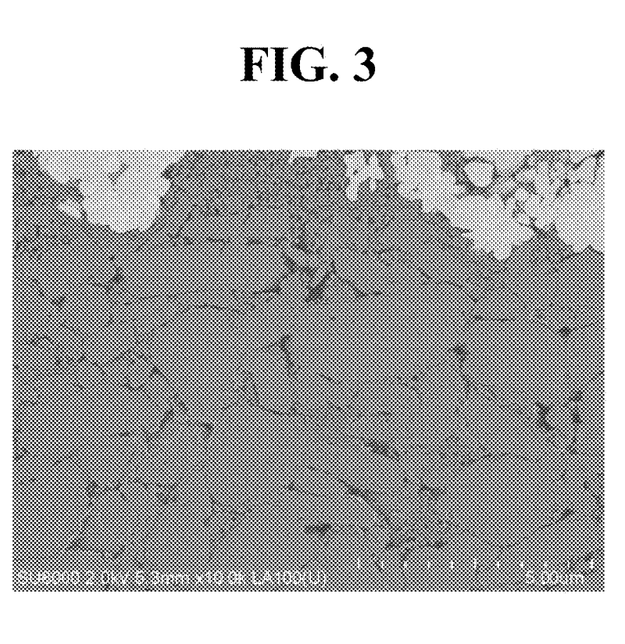
FIG. 3 is a scanning electron microscopic (SEM) image illustrating the section of the primer layer according to Example 1.

FIG. 3 is a scanning electron microscopic (SEM) image illustrating the section of the primer layer formed in this Example. Referring to FIG. 3, it can be seen that the primer layer has a porous structure wherein the space formed among the lithium carbonate particles function as pores.

Subsequently, $LiCoO_2$ having a D50 of about 15 to 20 µm as a positive electrode active material, Super P as a conductive material and polyvinylidene fluoride as a binder polymer were mixed at a weight ratio of 92:4:4, and N-methyl pyrrolidone (NMP) was added thereto to prepare positive electrode active material slurry. The prepared positive electrode slurry was applied onto the aluminum positive electrode current collector having the primer layer, and then dried in a vacuum oven at 120° C. to obtain a positive electrode including the positive electrode current collector, positive electrode active material layer, and the primer layer formed between the positive electrode current collector and the positive electrode active material layer.

Meanwhile, mesocarbon microbeads (MCMB) were used as a negative electrode active material and Super-P and PVdF were used as a conductive material and a binder, respectively, and the ingredients were mixed at a ratio (weight ratio) of 92:2:6 and dispersed in NMP to prepare negative electrode active material slurry. Subsequently, the negative electrode active material slurry was applied to a copper foil current collector, followed by drying, to obtain a negative electrode.

A polyethylene separator was interposed between the obtained positive electrode and negative electrode to provide an electrode assembly. The electrode assembly was introduced to a pouch type casing, and electrode leads were connected thereto. Subsequently, a solution containing ethylene carbonate (EC) and dimethyl carbonate (DMC) at a volume ratio of 1:1 and including 1M $LiPF_6$ dissolved therein was injected as an electrolyte, followed by sealing, to complete a lithium secondary battery.

Comparative Example 1

A positive electrode and a lithium secondary battery were obtained in the same manner as Example 1, except that 100 g of large lithium carbonate particles, i.e., lithium carbonate particles having a particle diameter of 5.0 µm were used instead of the two types of lithium carbonate particles when preparing slurry for forming a primer layer.

Figure 4:
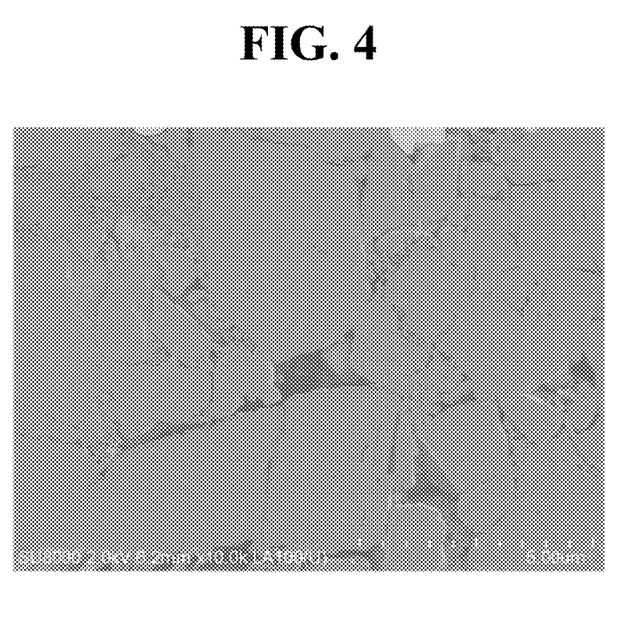
FIG. 4 is a scanning electron microscopic (SEM) image illustrating the section of the primer layer according to Comparative Example 1.

FIG. 4 is a SEM image illustrating the section of the primer layer formed in Comparative Example 1.

Comparative Example 2

A positive electrode and a lithium secondary battery were obtained in the same manner as Example 1, except that 100 g of small lithium carbonate particles, i.e., lithium carbonate particles having a particle diameter of 2.0 µm were used instead of the two types of lithium carbonate particles when preparing slurry for forming a primer layer.

Figure 5:
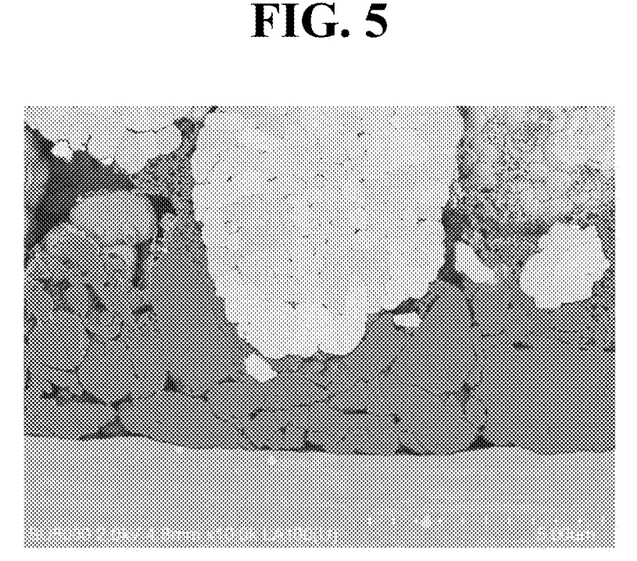
FIG. 5 is a scanning electron microscopic (SEM) image illustrating the section of the primer layer according to Comparative Example 2.

FIG. 5 is a SEM image illustrating the section of the primer layer formed in Comparative Example 2.

Test Example 1: Overcharge Test Result

A primer layer that generates gas when a specific voltage is attained causes an increase in resistance due to the gas generation of the primer layer in an overcharged state, resulting in application of overvoltage to attain the overcharge cutoff voltage, 6.4V. Basically, as the absolute amount of the conductive material in the primer layer is decreased, the conductive path is interrupted with high possibility upon the gas generation, and thus it is possible to attain the overcharge cutoff voltage earlier. However, in this case, there is a problem of an increase in the resistance of a battery. To solve this, a gas-generating material is realized in a bimodal type in the primer layer to attain the overcharge cutoff voltage in a safe region and to allow the battery to have DC (direct current) resistance equal to DC resistance of the battery having no primer layer, while reducing the absolute amount of the conductive material.

The overcharge test was carried out in a two-step mode. First, a state of SOC 100 was made at room temperature (25° C.) under ambient pressure in a CC/CV (constant current/constant voltage) condition of 0.33C/4.25V, wherein the cut-off current was 0.05 C (the first step: SOC 100 setting). Subsequently, charging was started at room temperature under ambient pressure in a CC (1C-rate) condition from SOC 100 to carry out the overcharge test, and then was terminated after 1 hour or when the voltage was 1.5 times of the maximum voltage to cause overcharge (the second step: overcharge). There is no limitation in size of specimens.

Figure 6:
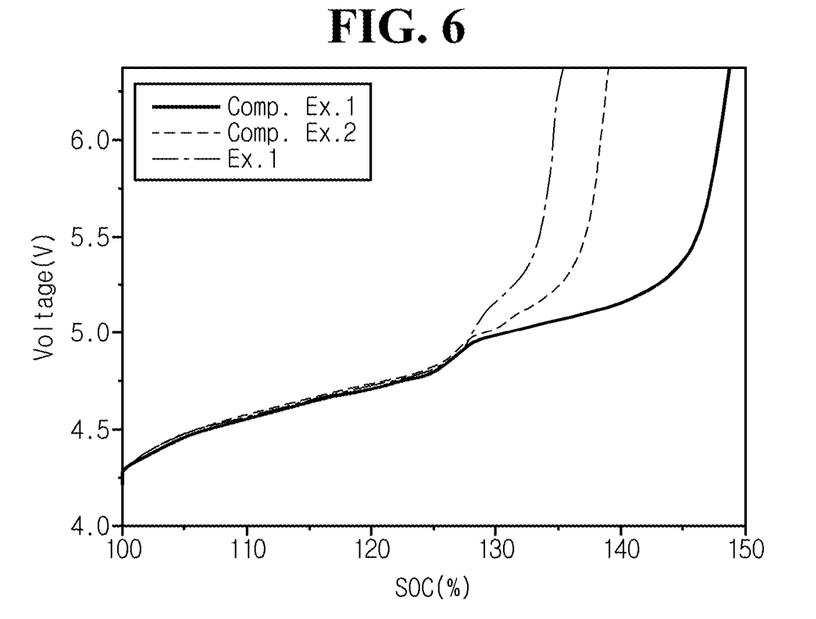
FIG. 6 is a graph illustrating the overcharge test results of the lithium secondary batteries according to Example 1 and Comparative Examples 1 and 2.

FIG. 6 is a graph illustrating the overcharge test results of the lithium secondary batteries according to Example 1 and Comparative Examples 1 and 2.

It can be seen that Example 1 attains the overcharge cutoff voltage at the earliest time.

Figure 7:
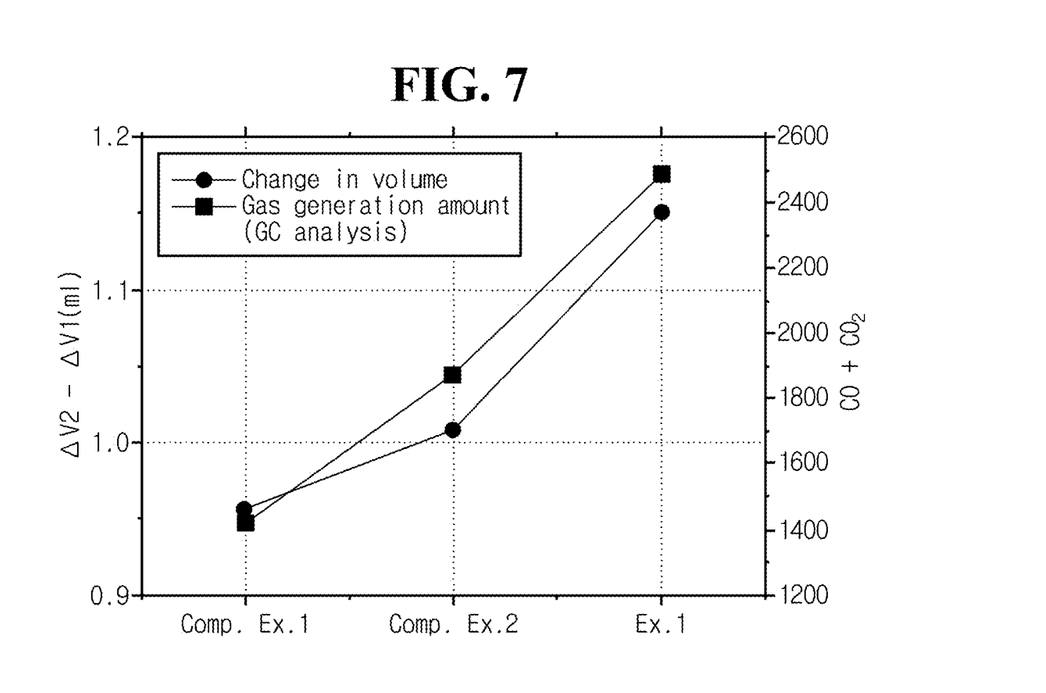
FIG. 7 is a graph illustrating the variations in volume and gas generation of the lithium secondary batteries according to Example 1 and Comparative Examples 1 and 2 during the overcharge test thereof.

Test Example 2: Results of Measurement of Change in Volume and Gas Generation Amounts Upon Overcharge A change in volume of each battery before/after overcharge and gas generation amount when the overcharge cutoff voltage was attained were determined. The results are shown in FIG. 7 and Table 1.

Herein, the change in volume before/after overcharge may be calculated using the weight measurement of each battery determined through a balance in a water tank before and after overcharge and the change in volume of water in the water tank. Each battery has the same weight before and after overcharge, but gas is generated in the battery after overcharge. Thus, when the weight of each battery is measured in the water tank, its weight is reduced slightly compared to the battery before the overcharge due to the effect of buoyancy. When using the difference in weight of the battery and the change in volume of water in the water tank, it is possible to determine the change in volume of the battery. When the battery was immersed in the water of the water tank, the exterior part of the battery was taped tightly to prevent water from infiltrating into the battery.

Meanwhile, the gas generation amount was determined by gas chromatography analysis. The results show amounts of CO and $CO_2$ gases.

TABLE 1

| | | Ex. 1 | Comp. Ex. 1 | Comp. Ex. 2 |
|---|---|---|---|---|
| Change in volume (mL) | | 1.151 | 0.956 | 1.008 |
| Gas generation amount (µL) | CO | 708 | 474 | 654 |
| | $CO_2$ | 1,780 | 951 | 1,220 |
| | CO + $CO_2$ | 2,488 | 1,425 | 1,874 |

Figure 8:
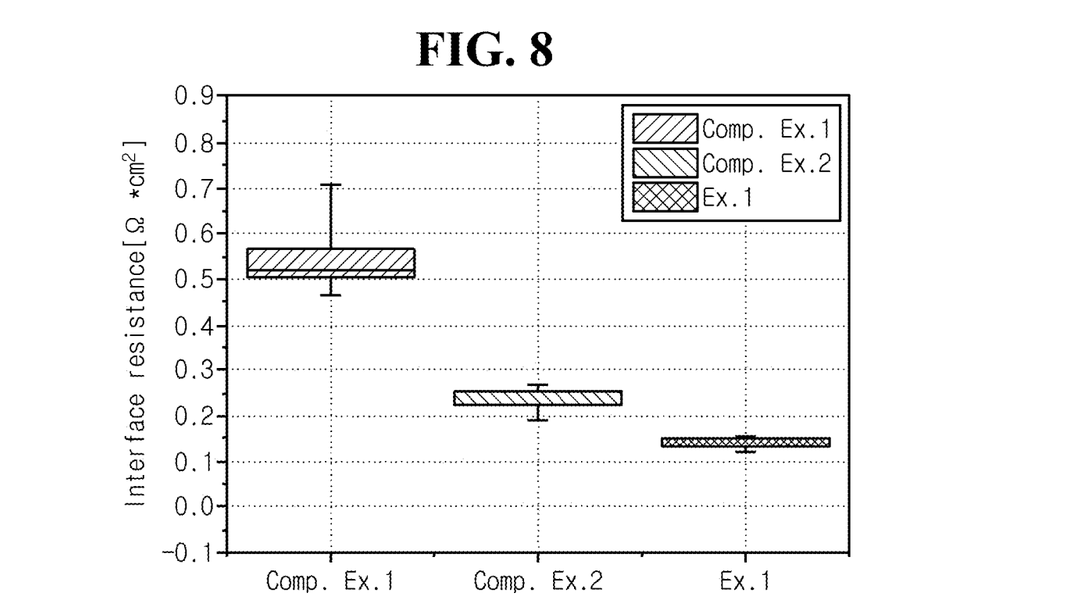
FIG. 8 is a graph illustrating the interfacial resistance of the primer layer of each of the positive electrodes according to Example 1 and Comparative Examples 1 and 2.
Figure 9:
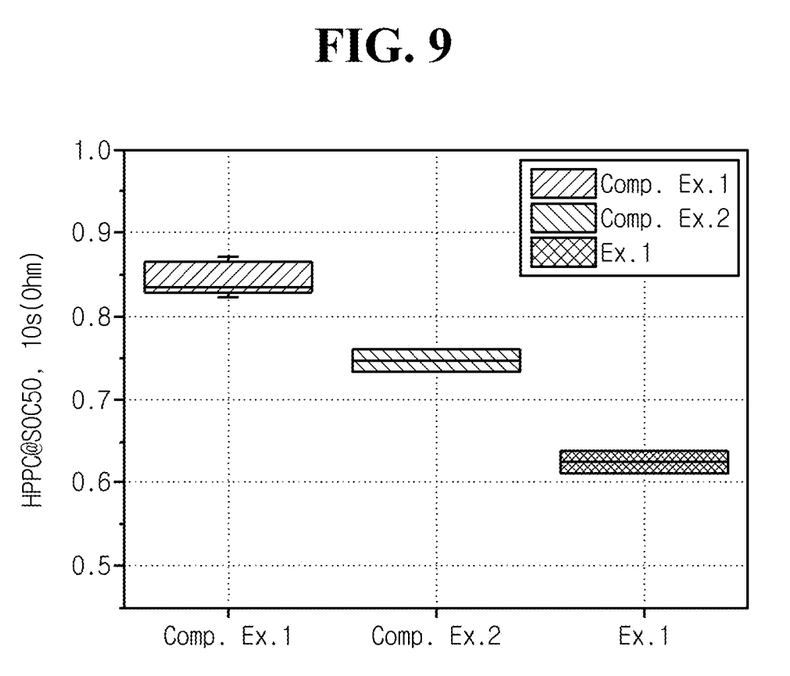
FIG. 9 is a graph illustrating the resistance of each of the lithium secondary batteries according to Example 1 and Comparative Examples 1 and 2.

Test Example 3: Results of Measurement of Resistance in Positive Electrode and Battery FIG. 8 is a graph illustrating the interfacial resistance of the primer layer of each of the positive electrodes according to Example 1 and Comparative Examples 1 and 2, and FIG. 9 is a graph illustrating the resistance of each of the lithium secondary batteries according to Example 1 and Comparative Examples 1 and 2.

The interfacial resistance of the primer layer of each positive electrode was determined using an electrode resistance measuring system (available from HIOKI, Model name: XF-074). After the measurement, it can be seen that Example 1 shows the lowest resistance value.

In addition, to measure the resistance of a lithium secondary battery, discharge was carried out for 10 s at 3C-rate in the state of SOC 50%. It was possible to calculate the DC resistance of the battery from the change in voltage at this time. As a result, it can be seen that Example 1 shows the lowest resistance value compared to Comparative Examples.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A positive electrode for a lithium secondary battery, comprising:
    a positive electrode current collector;
    a positive electrode active material layer; and
    a primer layer formed between the positive electrode current collector and the positive electrode active material layer,
    wherein the primer layer comprises lithium carbonate ($Li_2CO_3$) particles having two or more different particle diameters, a binder polymer, and a conductive material.

2. The positive electrode for a lithium secondary battery according to claim 1, wherein the lithium carbonate particles are present in an amount of 90 to 99.9 wt % based on the solid content in the primer layer.

3. The positive electrode for a lithium secondary battery according to claim 1, wherein the lithium carbonate particles comprise large lithium carbonate particles and small lithium carbonate particles.

4. The positive electrode for a lithium secondary battery according to claim 3, wherein the large lithium carbonate particles have a particle diameter of 3 to 15 µm, and the small lithium carbonate particles have a particle diameter equal to or greater than 0.1 µm and less than 3 µm.

5. The positive electrode for a lithium secondary battery according to claim 3, wherein the small lithium carbonate particles are present in an amount of 80 to 120 parts by weight based on 100 parts by weight of the large lithium carbonate particles.

6. The positive electrode for a lithium secondary battery according to claim 1, wherein the primer layer has a thickness of 3 to 15 µm.

7. The positive electrode for a lithium secondary battery according to claim 1, wherein the space formed among the lithium carbonate particles functions as pores in the primer layer.

8. The positive electrode for a lithium secondary battery according to claim 1, wherein the primer layer is porous.

9. A lithium secondary battery comprising the positive electrode for a lithium secondary battery according to claim 1.

* * * * *